UNITED STATES PATENT OFFICE.

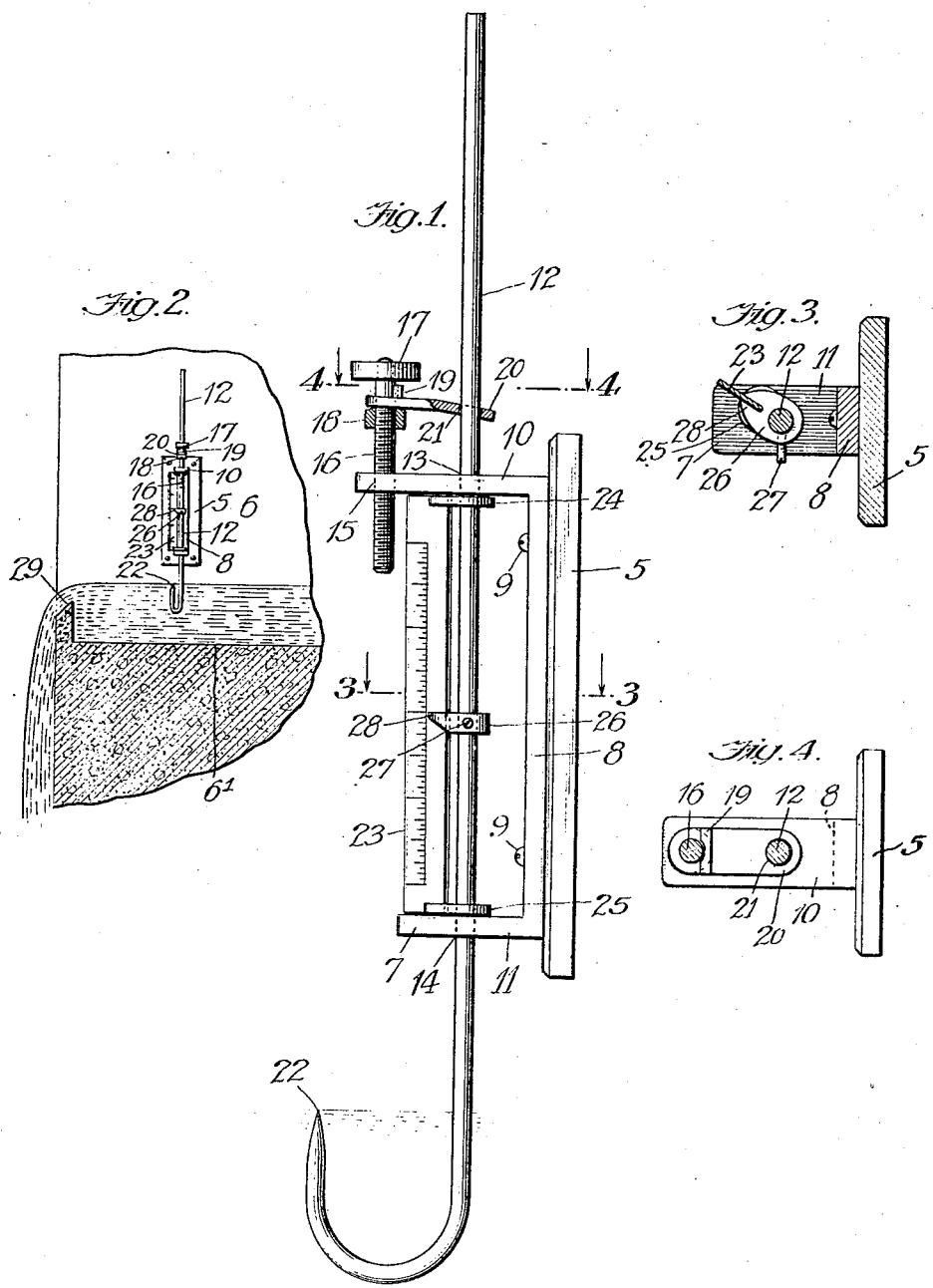

JAMES W. COX, OF WILMETTE, ILLINOIS, ASSIGNOR TO PACIFIC FLUSH TANK COMPANY, OF CHICAGO, ILLINOIS, A CORPORATION OF ILLINOIS.

WATER-GAGE.

1,283,681.  Specification of Letters Patent.  Patented Nov. 5, 1918.

Application filed March 8, 1915. Serial No. 12,812.

*To all whom it may concern:*

Be it known that I, JAMES W. COX, a citizen of the United States, residing at Wilmette, in the county of Cook and State of Illinois, have invented certain new and useful Improvements in Water-Gages, of which the following is a specification.

My invention relates to an instrument for determining the exact height of the surface of a stream of water in order to ascertain the quantity of water passing a given point in a given time. For this purpose it is customary to pass the stream to be measured over a level dam or weir between vertical side walls and by measuring the depth of the water and the speed at which it flows, determine the number of gallons of flow per minute or per hour, as the case may be. The rate of flow being constant the number of gallons is of course proportional to the depth of water over the dam or sill. As stated above, the object of my invention is a gage for accurately determining this depth designed to facilitate the rapid and convenient reading of the gage while at the same time providing for the required degree of accuracy.

In the accompanying drawing I have illustrated a preferred form of my invention but it is to be understood that the specific disclosure is for the purpose of exemplification only, the scope of the invention being set out in the following claims in which I have endeavored to distinguish the invention from the prior art so far as known to me, without, however, relinquishing or abandoning any portion or feature thereof.

In the drawing Figure 1 is a side elevation of my invention partly broken away and in section; Fig. 2 a reduced view showing the same in use; Fig. 3 a section on the line 3—3 of Fig. 1 looking in the direction of the arrows and Fig. 4 a section on the line 4—4 of Fig. 1 looking in the direction of the arrows.

A base plate 5 which may be of metal or other suitable material is adapted to be attached in a suitable position above the maximum level of the water to the side walls 6 of the measuring channel and carries a cast metal bracket 7 comprising a back portion 8 secured by screws 9, 9 to the base plate, an upper bracket arm 10 and a lower bracket arm 11 both perforated in vertical alinement for the passage of the gage rod 12. The latter is freely movable longitudinally through the openings 13, 14 in the upper and lower brackets respectively and is of a length determined by the distance which the device is to be placed above the normal water level and by the variations in level which it is intended to measure. The upper bracket arm 10 is perforated and tapped at 15 to receive a screw 16 which is adjustable therein by means of a knurled head 17 and provided with a collar 18 rigidly secured thereto and a fin or stud 19 between which is retained a clamp plate 20 by which the gage rod is supported from said screw. The opening 21 in said clamp through which said gage rod passes is slightly larger than the gage rod and preferably formed with parallel walls, and the fin or stud 19 and the collar 18 upon the screw are spaced sufficiently apart to permit of some play of the clamp in a vertical plane. Obviously when the clamp sags or cants to the angle shown in Fig. 1 the edges of the opening 21 engage the gage rod upon opposite sides and firmly hold the same. But when it is desired to move the gage rod relatively to the clamp the latter is raised or swung to such a position that the gage rod slides readily through the opening in the clamp.

In order to set the gage rod, the clamp is raised to the position in which the former may be readily moved therethrough and the gage rod is roughly adjusted by this means to the surface of the water. After the adjustment has been thus roughly made the screw is adjusted to first lower the upturned point 22 below the surface of the water and then to raise it into accurate register with the surface. By this construction we get the advantages of both rapid and accurate adjustment of the gage rod. In order to conveniently read the depth of water corresponding to the particular position to which the gage rod may be adjusted, I provide a scale 23 comprising an elongated plate of metal or other suitable material properly graduated and a pair of collars 24, 25 secured to said plate and embracing the gage rod below the upper bracket and above the lower bracket respectively. The engagement of the collars with the gage rod, however, is loose so that the latter may be readily adjusted therethrough and the gage rod carries an index 26 which as shown in Fig. 3 consists of a collar or perforated plate secured by the set screw 27 to the gage rod but slotted to embrace the edge of the scale plate 23 and extended upon opposite sides thereof. If desired both sides of the scale plate 23 may be calibrated. The angular position of the scale plate is of course determined by clamping the index upon the gage rod and convenience for reading the same determines its location. Obviously after the index is locked fast to the gage rod the position of the scale plate can only be changed by rotating the gage rod more or less.

The improved construction of gage has the above mentioned advantages of ready and quick adjustment and accurate indication. The device is simple and easy of construction and not delicate or apt to get out of order.

In Fig. 2 is shown the mode of employing the device. The channel is, as heretofore stated, formed with vertical side walls and may have a horizontal bottom $6^1$ and at a suitable point as 29 is provided with a weir or dam over which the water flows. The gage rod is accurately adjusted so that its point is in the same horizontal plane with the top of the weir, and when so adjusted, the index is at the zero position on the scale. The depth of the water above the dam may then be directly read upon the scale by adjusting the rod in the manner heretofore described to the surface of the water.

I claim:

1. In a water gage for the purpose set forth, a vertically movable gage rod, a support therefor, means for adjusting the gage rod comprising a screw having a threaded engagement with the support, a plate carried by the screw and having angular movement in a vertical plane with respect thereto, there being an opening in the plate, the walls of which are adapted to engage the gage rod in one position and to permit it to slide therethrough when the plate is in another position.

2. In a water gage for the purpose set forth, a support, a gage rod vertically adjustable with relation to said support, a screw, a clamp plate carried thereby and angularly adjustable with relation to said screw in a vertical plane, a scale plate rotatably mounted upon the gage rod and an index mounted on the gage rod and coöperating with the scale plate.

3. In a water gage for the purpose set forth, a bracket comprising upper and lower perforated arms, a gage rod vertically adjustable in the perforations of said arms, a screw tapped into one of said arms and vertically adjustable with relation thereto, a clutch plate loosely pivoted on said screw to have an angular movement in a vertical plane relative thereto, said clutch plate having an enlarged opening therein in register with the openings in the upper and lower bracket arms and surrounding and engaging said gage rod.

JAMES W. COX.

Witnesses:
ROBERT DOBBERMAN,
FIDELIS MAICHEN.

Copies of this patent may be obtained for five cents each, by addressing the "Commissioner of Patents, Washington, D. C."